(12) United States Patent
Rahimi Nasrabadi et al.

(10) Patent No.: US 12,008,736 B2
(45) Date of Patent: Jun. 11, 2024

(54) METHODS, SYSTEMS, AND PROGRAM PRODUCTS FOR GENERATING ALTERED IMAGES BASED ON ON-OFF VISUAL PATHWAY INFORMATION

(71) Applicant: The Research Foundation for the State University of New York, Albany, NY (US)

(72) Inventors: Hamed Rahimi Nasrabadi, Brooklyn, NY (US); José-Manuel Alonso, New York, NY (US)

(73) Assignee: The Research Foundation for the State University of New York, Albany, NY (US)

( * ) Notice: Subject to any disclaimer, the term of this patent is extended or adjusted under 35 U.S.C. 154(b) by 374 days.

(21) Appl. No.: 17/556,921

(22) Filed: Dec. 20, 2021

(65) Prior Publication Data
US 2022/0198629 A1 Jun. 23, 2022

Related U.S. Application Data

(60) Provisional application No. 63/127,736, filed on Dec. 18, 2020.

(51) Int. Cl.
| | |
|---|---|
| *G06K 9/40* | (2006.01) |
| *G06T 5/50* | (2006.01) |
| *G06T 7/90* | (2017.01) |
| *G06V 10/56* | (2022.01) |
| *G06V 10/60* | (2022.01) |

(52) U.S. Cl.
CPC .............. *G06T 5/50* (2013.01); *G06T 7/90* (2017.01); *G06V 10/56* (2022.01); *G06V 10/60* (2022.01); *G06T 2207/10081* (2013.01); *G06T 2207/10088* (2013.01); *G06T 2207/10116* (2013.01); *G06T 2207/10132* (2013.01); *G06T 2207/20212* (2013.01)

(58) Field of Classification Search
CPC .... G06T 5/50; G06T 5/90; G06T 7/90; G06T 2207/20212; G06T 2207/10081; G06T 2207/10088; G06T 2207/10116; G06T 2207/10024; G06T 2207/10132; G06V 10/56; G06V 10/60
USPC .................................................. 382/128, 274
See application file for complete search history.

(56) References Cited

U.S. PATENT DOCUMENTS

| | | | | |
|---|---|---|---|---|
| 6,628,823 B1 * | 9/2003 | Holm | ..................... | H04N 9/64 348/E9.037 |
| 2017/0161882 A1 * | 6/2017 | Mantiuk | ................ | A61B 3/024 |

* cited by examiner

*Primary Examiner* — Duy M Dang
(74) *Attorney, Agent, or Firm* — Lance D. Reich; Peter Fallon

(57) ABSTRACT

Images may be altered based on ON-OFF visual pathway information processing. A process for generating altered images may include separating an original image into distinct images based on luminance values for each pixel of the pixels that form the original image. The distinct images may include a first and a second separated image, where each separated image includes distinct pixels. Additionally, the process may include determining a first luminance range for the first separated image based on the luminance value for each pixel forming the first separated image, and determining a second luminance range for the second separated image based on the luminance value for each pixel forming the second separated image. The process may also include adjusting visual parameters of the first and second separated images, and combining the adjusted, first and second separated images to generate the altered image.

20 Claims, 13 Drawing Sheets

METHODS, SYSTEMS, AND PROGRAM PRODUCTS FOR GENERATING ALTERED IMAGES BASED ON ON-OFF VISUAL PATHWAY INFORMATION

CROSS-REFERENCE TO RELATED APPLICATIONS

This application claims priority to U.S. provisional application No. 63/127,736 filed on Dec. 18, 2020, the content of which is hereby incorporated by reference into the present application.

GOVERNMENT RIGHTS

This invention was made with government support under Grant Nos. EY005253 and EY027361 awarded by the National Institutes of Health. The government has certain rights in the invention.

BACKGROUND

The disclosure relates generally to image processing, and more particularly, to methods, systems, and program products for generating altered images based on ON-OFF visual pathway information processing.

Conventional image capture and/or image post processing typical utilizes adjusting images properties (e.g., contrast, saturation, etc.) to enhance the image. Some of these adjustments may be performed automatically using algorithms and/or generated artificial intelligence. However, many contrast enhancement algorithms, for example, change the original image histogram in a way that the resulting image loses critical information regarding the mean luminance and statistics of the natural scenes.

Studies on the human and animal's cortical response properties and natural scene's statistics has led to discoveries in deciphering how the brain processes visual contrast and luminance in a complex visual scene. However, these findings have not been incorporated in the images processing tools—for example, in image enhancement algorithms.

BRIEF DESCRIPTION

A first aspect of the disclosure provides a method for generating an altered image. The method includes: separating an original image into distinct images based on a luminance value for each pixel of a plurality of pixels forming the original image, the distinct images including: a first separated image formed from a first group of pixels of the original image, and a second separated image formed from a second group of pixels of the original image, the second group of pixels distinct form the first group of pixels; determining a first luminance range for the first separated image, the first luminance range based on the luminance value for each pixel of the first group of pixels of the first separated image; determining a second luminance range for the second separated image, the second luminance range based on the luminance value for each pixel of the second group of pixels, wherein the second luminance range is distinct from the first luminance range; adjusting visual parameters of the first separated image formed from the first group of pixels based on a first luminance function; adjusting visual parameters of the second separated image formed from the second group of pixels based on a second luminance function; and combining the adjusted, first separated image and the adjusted, second separated image to generate the altered image.

A second aspect of the disclosure provides a system including: an image capture device; and at least one computing device operably connected to the image capture device, the at least one computing device generating an altered image from an original image captured by the image capture device by performing processes including: separating an original image into distinct images based on a luminance value for each pixel of a plurality of pixels forming the original image, the distinct images including: a first separated image formed from a first group of pixels of the original image, and a second separated image formed from a second group of pixels of the original image, the second group of pixels distinct form the first group of pixels; determining a first luminance range for the first separated image, the first luminance range based on the luminance value for each pixel of the first group of pixels of the first separated image; determining a second luminance range for the second separated image, the second luminance range based on the luminance value for each pixel of the second group of pixels, wherein the second luminance range is distinct from the first luminance range; adjusting visual parameters of the first separated image formed from the first group of pixels based on a first luminance function; adjusting visual parameters of the second separated image formed from the second group of pixels based on a second luminance function; and combining the adjusted, first separated image and the adjusted, second separated image to generate the altered image.

A third aspect of the disclosure provides a computer program product stored on a non-transitory computer-readable storage medium, which when executed by a computing system, generates an altered image based on an original image captured by an image capture device, the computer program product including: program code that separates an original image into distinct images based on a luminance value for each pixel of a plurality of pixels forming the original image, the distinct images including: a first separated image formed from a first group of pixels of the original image, and a second separated image formed from a second group of pixels of the original image, the second group of pixels distinct form the first group of pixels; program code that determines a first luminance range for the first separated image, the first luminance range based on the luminance value for each pixel of the first group of pixels of the first separated image; program code that determines a second luminance range for the second separated image, the second luminance range based on the luminance value for each pixel of the second group of pixels, wherein the second luminance range is distinct from the first luminance range; program code that adjusts visual parameters of the first separated image formed from the first group of pixels based on a first luminance function; program code that adjusts visual parameters of the second separated image formed from the second group of pixels based on a second luminance function; and program code that combines the adjusted, first separated image and the adjusted, second separated image to generate the altered image.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

As an initial matter, in order to clearly describe the current disclosure it will become necessary to select certain terminology when referring to and describing relevant components within the disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

As discussed herein, the disclosure relates generally to image processing, and more particularly, to methods, systems, and program products for generating altered images based on ON-OFF visual pathway information processing.

These and other embodiments are discussed below with reference to FIGS. 1-13. However, those skilled in the art will readily appreciate that the detailed description given herein with respect to these Figures is for explanatory purposes only and should not be construed as limiting.

Figure 1:
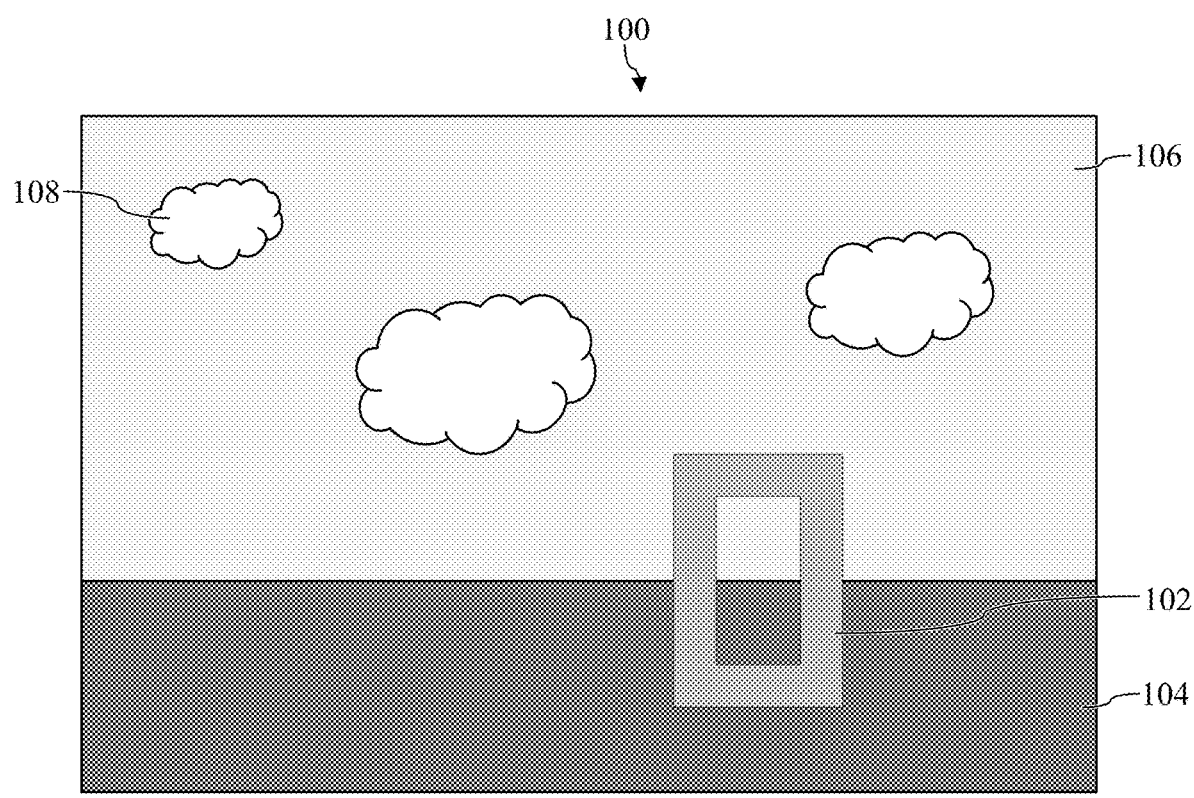
FIG. 1 shows an illustrative view of an original image captured by an image capture device, according to embodiments of the disclosure.

FIG. 1 shows a illustrative view of an original image 100. Original image 100 may be formed as a digital and/or electronic image, photograph, graphic, video-recording, or any other suitable digital media. In the non-limiting example shown in FIG. 1, original image 100 may include a captured, digital photograph as discussed herein. As such, and as discussed herein (see, FIG. 2), original image 100 may be formed from a plurality of individual pixels. Additionally, Original image 100 may be captured, obtained, and/or generated by an image capture device (see, FIG. 13). The image capture device may be formed as any suitable device, system, and/or apparatus configured to generate, obtain, and/or capture original image 100. In non-limiting examples, image capture device may be formed as a photography camera, a video camera, a media/communication device (e.g., cell phone, tablet), a computing device (e.g., laptop), a scanner, an X-ray imaging device, computed tomography (CT) device, an ultrasound device, a magnetic resonance imaging (MM) device, or the like. Original image 100, as shown in FIG. 1, may be captured by a photography/video camera included on a communication device (e.g., cell phone).

Original image 100 formed as a photograph may depict a plurality of objects. For example, and as shown in FIG. 1, original image 100 may depict a sculpture 102 positioned on ground 104. additionally, original image 100 may depict a substantially clear sky 106 that includes clouds 108.

In the non-limiting example shown in FIG. 1, original image 100 may be captured, generated, and/or obtained as a black-and-white or grayscale image. In other non-limiting examples, and as discussed herein, original image 100 may include a color or colorized image. the process is discussed herein for generating an altered image based on original image 100 may be performed in a substantially similar way, whether original image 100 is formed as a grayscale image or color image. Distinctions in the processes between grayscale images and color images are discussed in detail herein.

Figure 2:
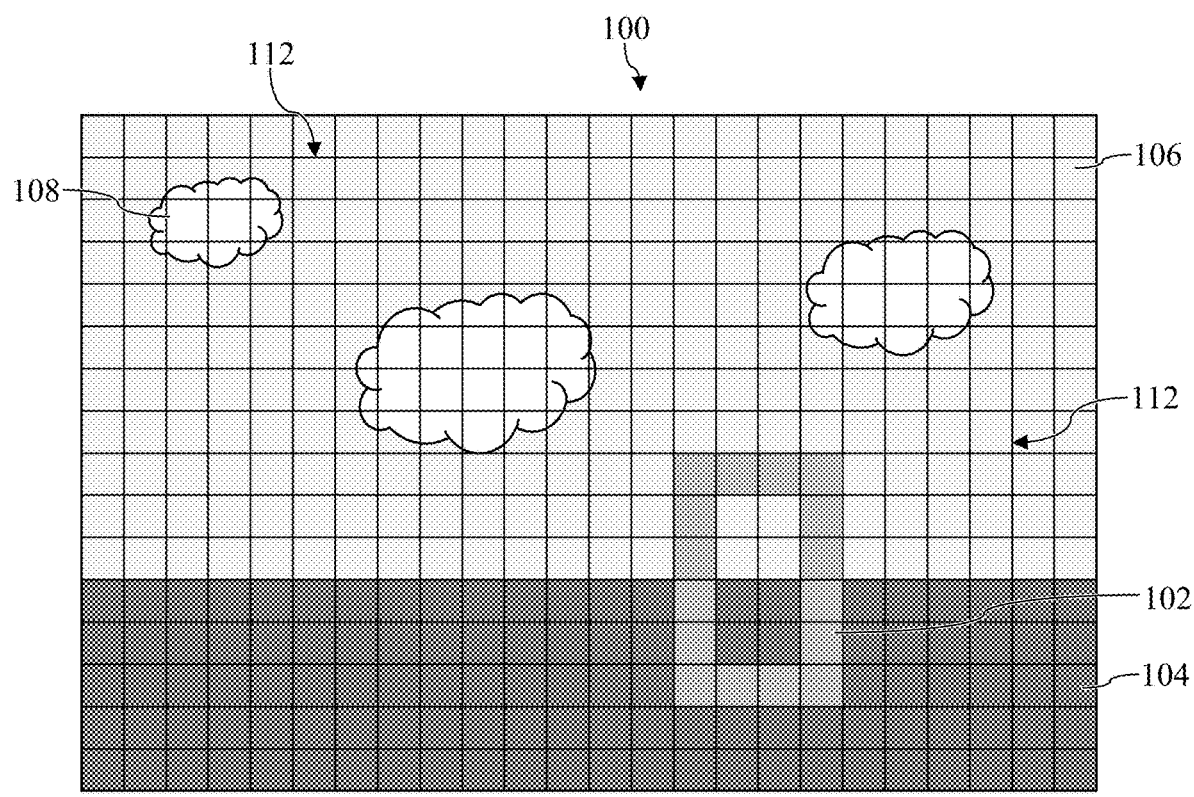
FIG. 2 shows an illustrative view of the original image of FIG. 1 depicting various pixels forming the image, according to embodiments of the disclosure.

Original image 100 shown in FIG. 1 may also include image characteristics that may be dependent, at least in part, on the image and/or the features captured therein. In a non-limiting example, original image 100 may include a luminance range that is dependent upon calculated luminance values for each pixel forming original image 100. That is, each image, including original image 100, that may undergo the processes discussed herein for generating an altered image (see, FIG. 6), may include a luminance range as defined by a calculated or determined by luminance values for each of the plurality of pixels forming the images (e.g., original image 100). Turning to FIG. 2, original image 100 is shown as being formed from a plurality of adjoining pixels 112. More specifically, FIG. 2 depicts an example of original image 100 divided, segmented, and/or sectioned by the individual pixels 112 that collective form the image. The luminance values for each pixel 112 forming original image 100 may be dependent, at least in part, on the brightness, contrast, color (where applicable), saturation, and/or sensitivity (e.g., ISO) of the portion of the image captured/formed by each pixel 112. In a non-limiting example, the luminance range for original image 100 may be between approximately zero (0) candela per square meter ($cd/m^2$) and approximately 15,000 $cd/m^2$. It is understood that the luminance range may be dependent, at least in part, on the operational characteristics or parameters of the image capture device capturing original image 100.

With reference to FIGS. 1-6, the process of generating an altered image (see, FIG. 6) based on original image 100 may now be discussed. It is understood that similarly numbered and/or named components may function in a substantially similar fashion. Redundant explanation of these components has been omitted for clarity.

Figure 3:
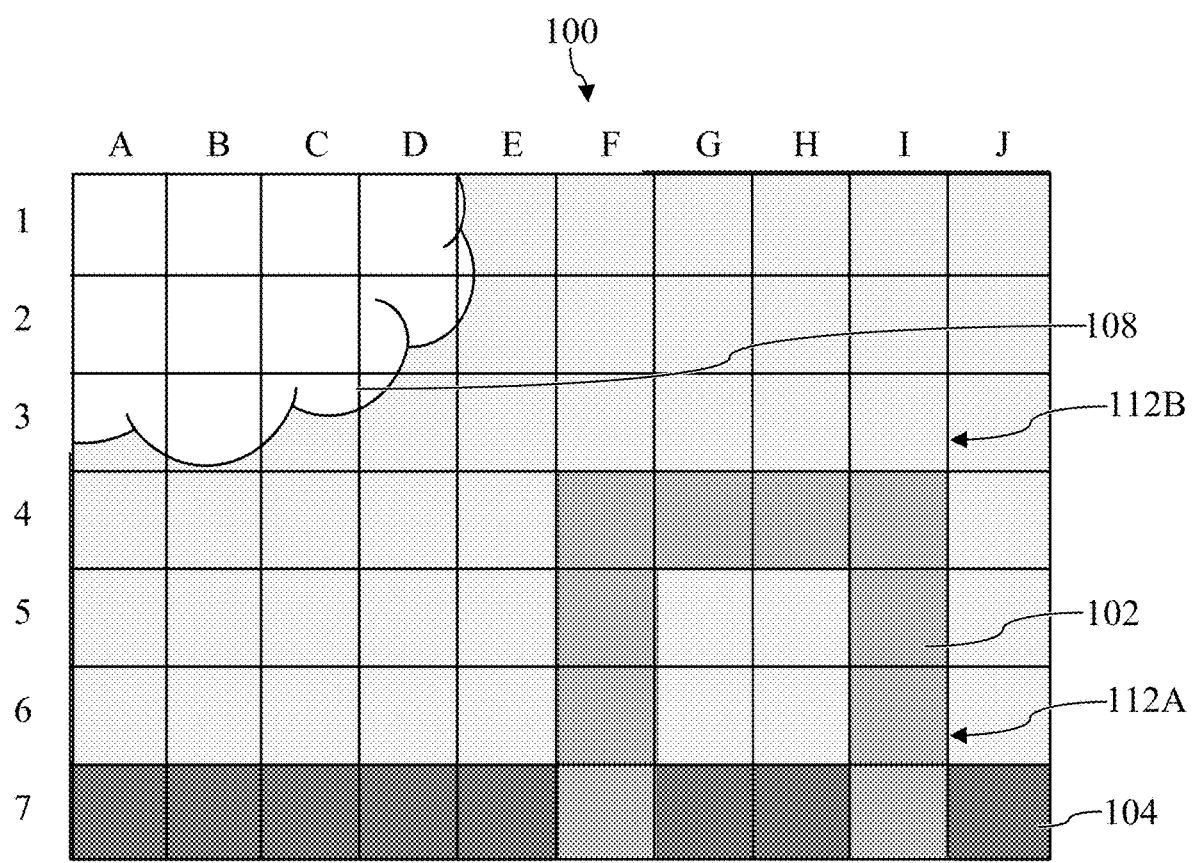
FIG. 3 shows an illustrative view of a portion of the original image of FIG. 2 including various pixels, according to embodiments of the disclosure.

After capturing, obtaining, and/or generating original image 100 formed from a plurality of pixels 112, a mean luminance value for original image 100 may be determined, calculated, and/or generated. As discussed herein with reference to FIG. 2, original image 100 may include and/or may be formed from a plurality of pixels 112, where each pixel 112 of the plurality of pixels 112 includes a luminance value. Turning to FIG. 3, a portion of pixelated original image 100 is shown. In the example, pixel 112 located at column A, row 7 (A7) may include/depict ground 104 in original image 100. The luminance value for pixel 112 at A7 may be approximately 0 $cd/m^2$. Additionally in the non-limiting example, pixel 112 located at column A, row 1 (A1) may include/depict cloud 108 in original image 100, and may include a luminance value of approximately 10,000 $cd/m^2$. The difference in luminance values for pixels 112 at A1, A7 may be a result of the contrast, color, brightness, saturation, sensitivity associated with each feature captured in image 100—e.g., ground 104 (e.g., dirt) is darker in grayscale/color than cloud 108 (e.g., substantially white). Different features captured or depicted in original image 100 may also include distinct luminance values. More specifically, the pixels 112 including and/or depicting each feature captured in original image 100 may also have distinct/unique luminance values. For example, pixel 112 at A5 may include sky 106 and may have a luminance value of approximately 8,000 $cd/m^2$. Pixel 112 at G4 may depict a portion of sculpture 102, and may have an associated or determined luminance value of approximately 2,000 $cd/m^2$. It is understood that the luminance values provided herein are illustrative and are dependent on various characteristics of original image 100 and not necessarily the features of image 100 that pixels 112 depict and/or include. That is, it is understood that all pixels 112 including a single feature (e.g., sky 106) may have distinct luminance values based on image characteristics including, but not limited to, brightness, contrast, color (where applicable), and/or saturation characteristics of original image 100.

Using the determined or detected luminance values for each pixel forming original image 100, mean luminance value for original image 100 may be calculated. The mean luminance value for original image 100 may be calculated based on and/or using the determined luminance values for original image 100. In the non-limiting example where original image 100 include a plurality of pixels having luminance values ranging from 0 $cd/m^2$ to 10,000 $cd/m^2$, the calculated, mean luminance value may be approximately 2,000 $cd/m^2$. The calculated mean luminance value may be based not only on the luminance value for each pixel, but all the number of pixels forming original image 100. As discussed herein, the mean luminance value as calculated based on luminance values, may aid in processing, analyzing, and/or manipulating original image 100 to generate the altered image.

Figure 4A:
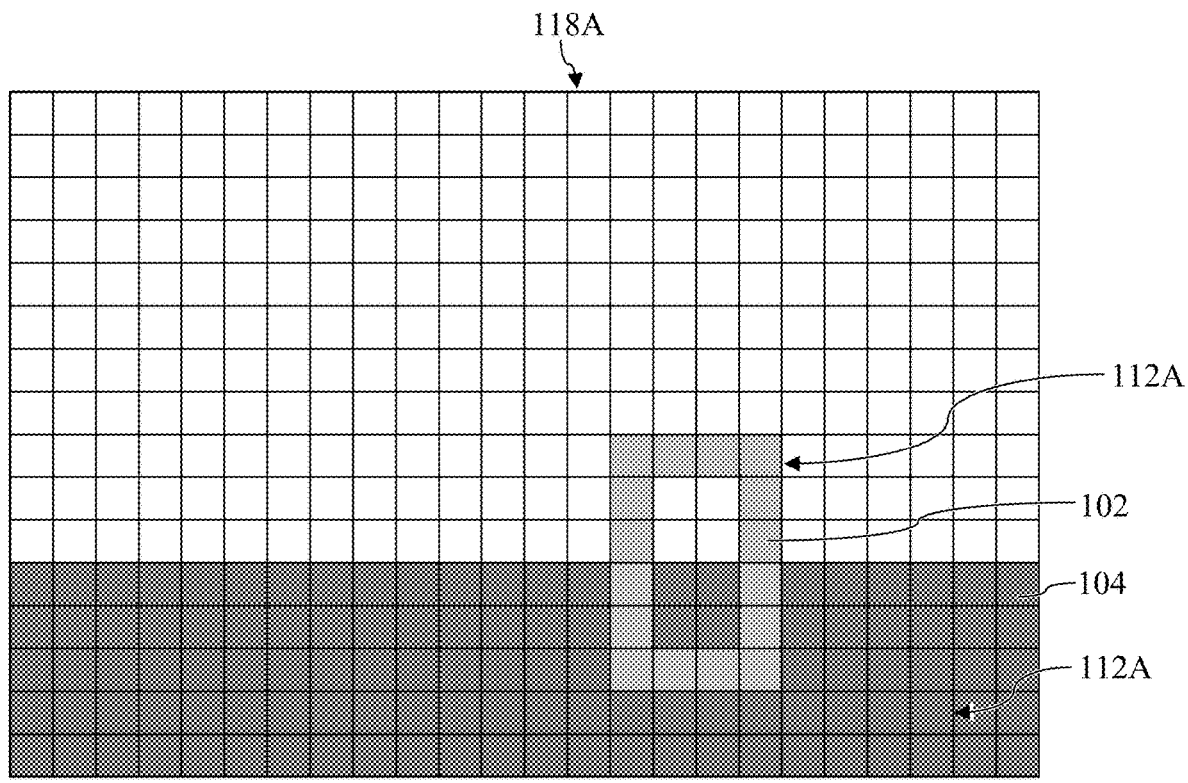
FIG. 4A shows an illustrative view of a first separated image formed from the original image of FIG. 1, according to embodiments of the disclosure.
Figure 5A:
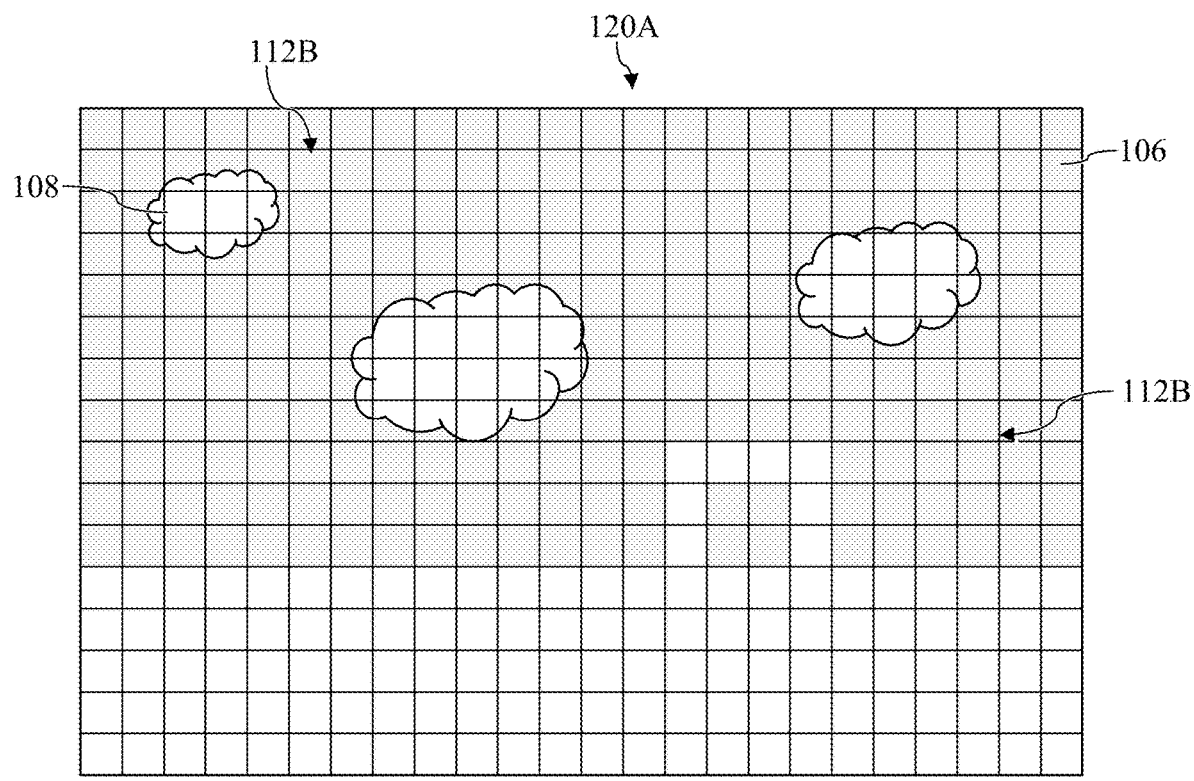
FIG. 5A shows an illustrative view of a second separated image formed from the original image of FIG. 1, according to embodiments of the disclosure.

Subsequent to the determination/detection of the luminance values and/or calculating the mean luminance value for original image 100, original image 100 may be separated into at least two distinct images 118A, 120A (see, FIGS. 4A and 5A). As discussed herein, separating original image 100 into at least two distinct images 118A, 120A may be based and/or dependent, at least in part, on the calculated mean luminance value. In the non-limiting examples shown in FIGS. 4A and 5A, two distinct images 118A, 120A may be formed, generated, and/or created by separating original image 100. First separated image 118A may be formed from a first group of pixels 112A of original image 100. The first group of pixels 112A may be associated with pixels 112 of original image 100 that may include luminance values below or equal to the calculated mean luminance value. That is, separating original image 100 into first separated image 118A may further include comparing the luminance value for each pixel 112 of the plurality of pixels forming original image 100 to the calculated mean luminance value. Once compared, at least one pixel of the plurality of pixels 112 may be associated, grouped, and/or identified with the first group of pixels 112A included in and/or forming first separated image 118A, where the luminance value of the associated pixel 112A is less than or equal to the calculated mean luminance value. In the non-limiting example, the first separated image formed from the first group of pixels 112A may correspond to and/or form an OFF image or an image formed from pixels that correspond to OFF visual pathway information. As shown in FIG. 4A, pixels 112A of the first group for first separated image 118A may include sculpture 102 and ground 104. This is because the luminance values for each of the pixels 112A are below the calculated mean luminance value—e.g., sculpture 102=2,000 $cd/m^2$, ground 104=0 $cd/m^2$, mean luminance value=2,000 $cd/m^2$.

Original image 100 may also be separated into a second separate image 120A based on the determined luminance range and/or the calculated mean luminance value. As shown in FIG. 5A, second separate image 120A may be formed from a second group of pixels 112B of original image 100. Distinct from the first group of pixels 112A, the second group of pixels 112B may be associated with pixels 112 of original image 100 that may include luminance values greater than the calculated mean luminance value. That is, separating original image 100 into second separated image 120A may further include comparing the luminance value for each pixel 112 of the plurality of pixels forming original image 100 to the calculated mean luminance value, and associating, grouping, and/or identifying at least one pixel of the plurality of pixels 112 with the second group of pixels 112B included in and/or forming second separated image 120B. The luminance value of the associated pixel 112B may be greater than the calculated mean luminance value for original image 100. In the non-limiting example, the second separated image 120A formed from the second group of pixels 112B may correspond to and/or form an ON image or an image formed from pixels that correspond to ON visual pathway information. As shown in FIG. 5A, pixels 112B of the second group for second separated image 120A may include sky 106 and cloud 108. This is because the luminance values for each of the pixels 112B are greater than the calculated mean luminance value—e.g., sky 106=8,000 cd/m$^2$, cloud 108=10,000 cd/m$^2$; mean luminance value=2,000 cd/m$^2$ (NA=0 cd/m$^2$).

Once separated into distinct images 118A, 120A, the luminance range for each of the separated images 118A, 120A may be determined and/or defined. That is, a first luminance range for first separated image 118A may be determined, and a second luminance range for second separated image 120A may be determined. First luminance range may be based on the luminance value for each pixel of the first group of pixels 112A of first separated image 118A. Additionally, second luminance range may be based on luminance value for each pixel of the second group of pixels 112B of second separated image 120A. First luminance range and second luminance range may thus define the upper and lower limits in each of first separated image 118A and second separated image 120A, respectively. In the non-limiting example, first luminance range for first separated image 118A may include a luminance range from 0 cd/m$^2$ to 2,000 cd/m$^2$. Additionally in the example, second luminance range for second separated image 120A may include a luminance range from 2,000 cd/m$^2$ to 10,000 cd/m$^2$.

In another non-limiting example, after determining the first and second luminance ranges for separated images 118A, 120A, and calculating the mean luminance value for original image 100, the luminance values associated with each of first separated image 118A and second separated image 120A may be truncated, shifted, and/or manipulated. That is, corresponding luminance values for each pixels 112A, 112B forming separated images 118A, 120A may be "numerically" adjusted such that the lower limit and upper limit of the luminance values that define the luminance range may be defined by a negative and positive limit, respectively. For example, where the determined luminance range for original image 100 is 0 cd/m$^2$ to 10,000 cd/m$^2$, the numerically adjusted luminance values defining the range may become or be manipulated to be −2,000 cd/m$^2$ to 5,000 cd/m$^2$. First luminance range for first separated image 118A may be adjusted from 0 cd/m$^2$ to 2,000 cd/m$^2$ to −2,000 cd/m$^2$ to 0 cd/m$^2$. Additionally, second luminance range for second separated image 120A may be adjusted from 2,000 cd/m$^2$ to 10,000 cd/m$^2$ to 0 cd/m$^2$ to 5,000 cd/m$^2$. As such, the calculated mean luminance value may also be adjusted to 0 cd/m$^2$. In this example, the luminance value for pixel 112 at A7 may be numerically adjusted to approximately −2,000 cd/m$^2$, and the luminance value for pixel 112 at A1 may be adjusted to approximately 5,000 cd/m$^2$. Furthermore, the luminance value for pixel 112 at A5 may be numerically adjusted to approximately 3,000 cd/m$^2$, and luminance value for pixel 112 at G4 may be adjusted to approximately −1,000 cd/m$^2$. The numerical adjustment is understood as manipulating or adjusting determined/calculated values, and does not manipulate, alter, and/or adjust visual characteristics (e.g., contrast, saturation, ISO, etc.) of original image 100 and/or the various pixels 112 forming original image 100.

Once original image 100 (e.g., FIGS. 1 and 2) is separated into at least two distinct separated images 118A, 120A, and the luminance range is determined for each separated image 118A, 120A, separated images 118A, 120A may be adjusted. More specifically, visual parameters of separated images 118A, 120A may be truncated, altered, modified, and/or changed. The visual parameters adjusted in each separated image 118A, 120A may include, but are not limited to, brightness, contrast, color (where applicable), saturation, and/or sensitivity (e.g., ISO). The adjustment to the visual parameters of first separated image 118A formed from first group of pixels 112A may be based on first luminance function(s). In a non-limiting example, first luminance function(s) may include a linear function defined by or between a minimum dark/OFF luminance contrast and a maximum dark/OFF luminance contrast. The minimum dark/OFF luminance contrast and maximum dark/OFF luminance contrast may be dependent on, at least in part, the luminance ranges of separated images 118A, 120A. Alternatively, the minimum dark/OFF luminance contrast and maximum dark/OFF luminance contrast may be predefined and/or predetermined. As such, and in a non-limiting example, adjusting the visual parameters of first separated image based on first luminance function may include adjusting the luminance value of each pixel included in first group of pixels 112A forming first separated image to an adjusted luminance value based on the minimum dark/OFF luminance value and maximum dark/OFF luminance value.

Figure 4B:
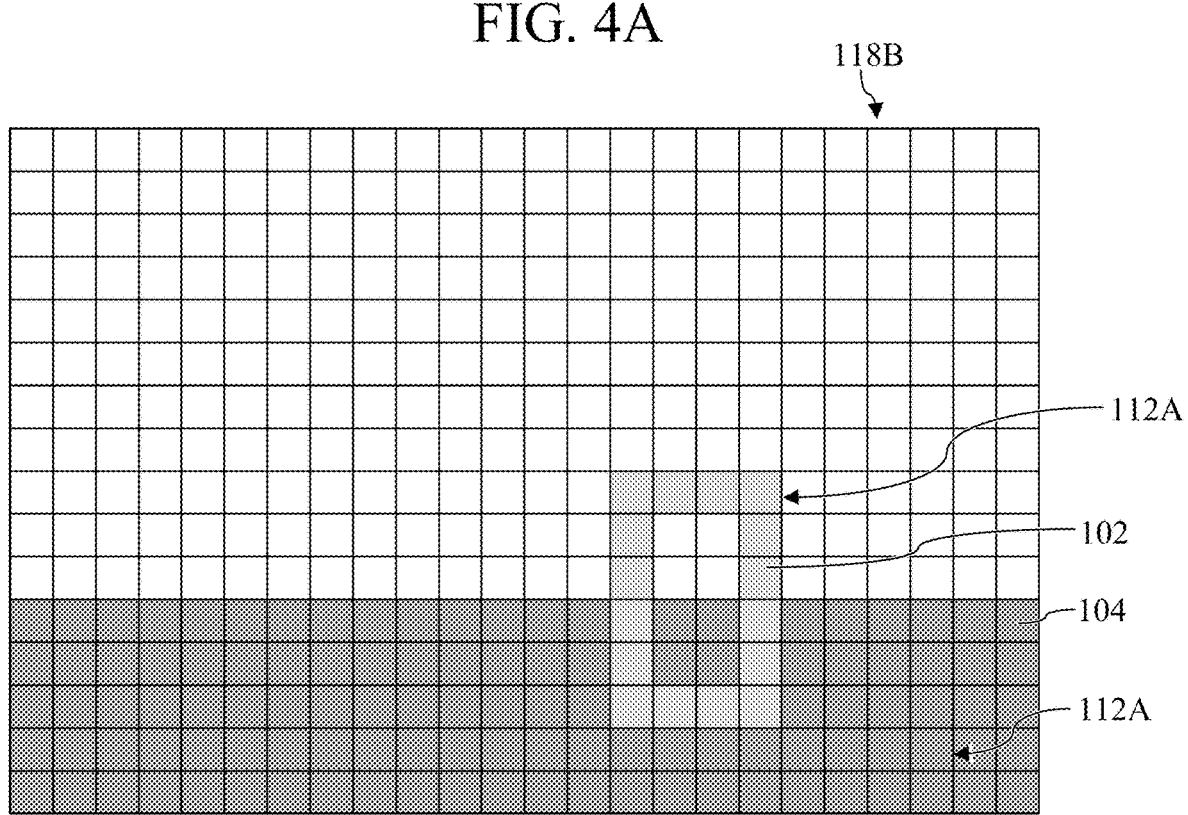
FIG. 4B shows an illustrative view of an adjusted, first separated image based on the first separated image of FIG. 4A, according to embodiments of the disclosure.

Turning to FIG. 4B, and with comparison to FIG. 4A, visual parameters of first separated image 118A depicting sculpture 102 and ground 104 via first group of pixels 112A may be adjusted, altered, and/or changed. Specifically, and based on a predetermined minimum dark/OFF luminance value=1,500 cd/m$^2$ (numerically adjusted NA=−500 cd/m$^2$) and maximum dark/OFF luminance value=500 cd/m$^2$ (numerically adjusted (NA)=−1,500 cd/m$^2$), the luminance value for each pixel 112A forming first separated image 118A may be adjusted linearly. For example, ground 104 having detected, determined, and/or actual luminance equal to 0 cd/m$^2$ (numerically NA=−2,000 cd/m$^2$), may now include an adjusted luminance value of approximately =500 cd/m$^2$ (numerically adjusted (NA)=−1,500 cd/m$^2$) based on the maximum dark/OFF luminance value. Additionally, other pixels including in the first group of pixels 112A forming first separated image 118A may be similarly, and linearly, adjusted backed on the minimum dark/OFF luminance value and maximum dark/OFF luminance value. As a result of adjusting the luminance values of pixels 112A, adjusted, first separated image 118B, as shown in FIG. 4B may be generated, created, and/or formed.

Similar to first separated image 118A, second separated image 120A may also have visual parameters adjusted. Visual parameters of second separated image 120A may be adjusted based on second luminance function(s), which may be distinct from first luminance function(s), discussed herein. In a non-limiting example, second luminance function(s) may include a sigmoid function defining a minimum light/ON luminance contrast and a maximum light/ON luminance contrast. The minimum light/ON luminance contrast and maximum light/ON luminance contrast may be dependent on, at least in part, the luminance ranges of separated images 118A, 120A. Alternatively, the minimum light/ON luminance contrast and maximum light/ON luminance contrast may be predefined and/or predetermined. In another non-limiting example, second luminance function(s) may include a piecewise linear function defining a plurality of predetermined minimum light/ON luminance value and a plurality of maximum light/ON luminance value. As such, and in a non-limiting example, adjusting the visual parameters of second separated image based on second luminance function(s) may include adjusting the luminance value of each pixel included in second group of pixels 112B forming second separated image 120A to an adjusted luminance value based on the minimum light/ON luminance value(s) and maximum light/ON luminance value(s).

Figure 5B:
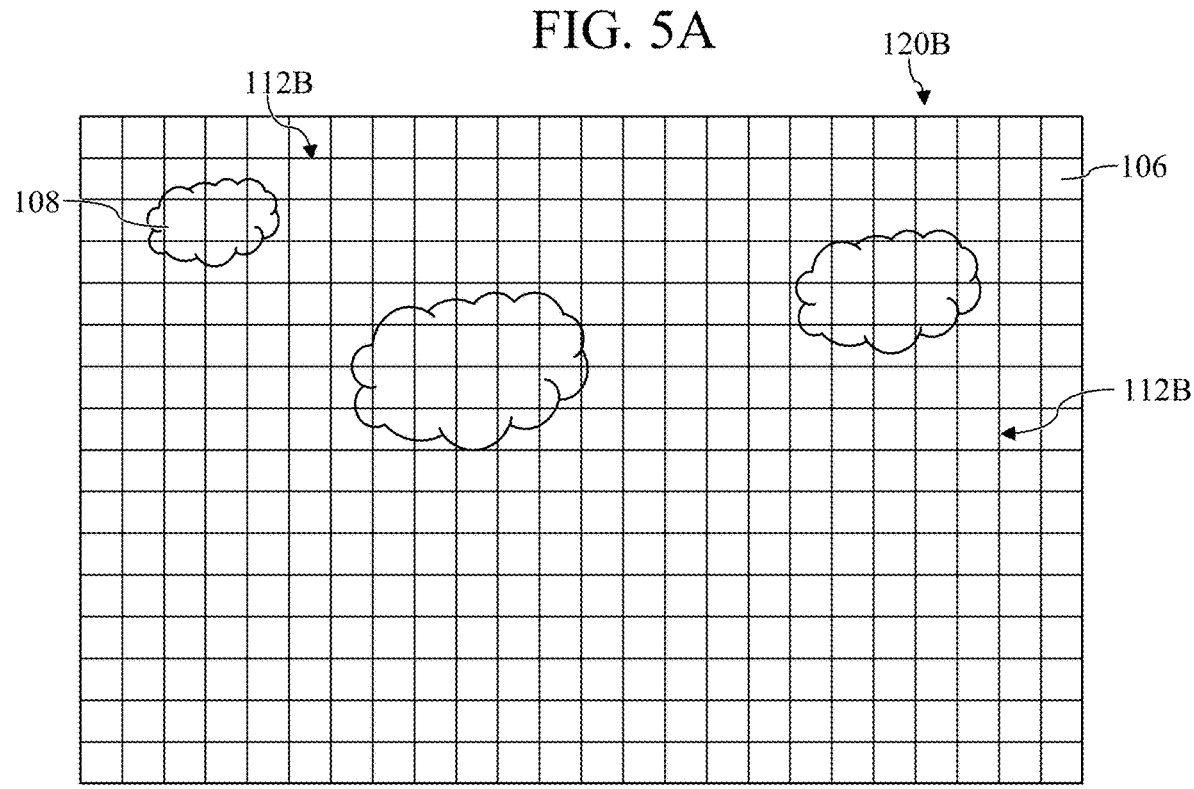
FIG. 5B shows an illustrative view of an adjusted, second separated image based on the second separated image of FIG. 5A, according to embodiments of the disclosure.
Figure 6:
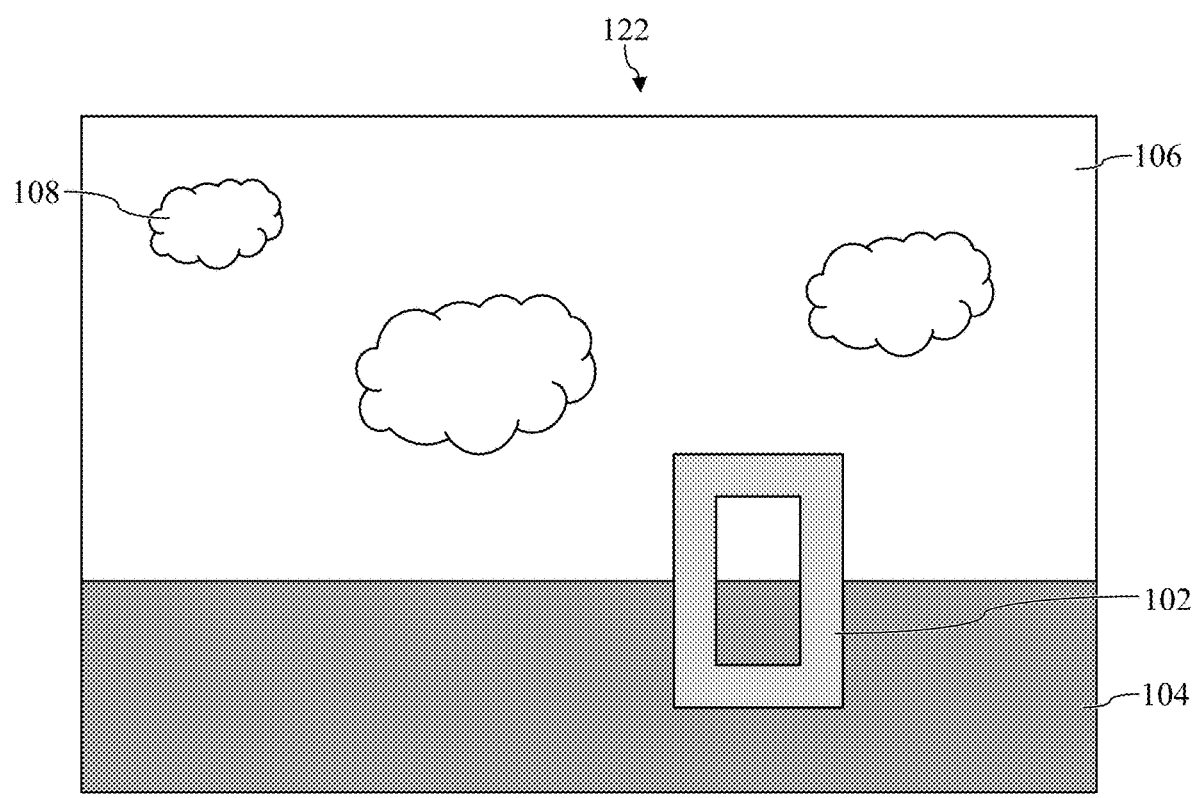
FIG. 6 shows an illustrative view of an altered image formed by combing the adjusted, first separated image (e.g., FIG. 4B) and the adjusted, second separated image (e.g., FIG. 5B), according to embodiments of the disclosure.

Turning to FIG. 5B, and with comparison to FIG. 5A, visual parameters of second separated image 120A depicting sky 106 and cloud 108 via second group of pixels 112B may be adjusted, altered, and/or changed. Specifically, and based on predetermined minimum light/ON luminance values and maximum light/ON luminance values, the luminance value for each pixel 112B forming second separated image 120A may be adjusted dependent upon the sigmoid function or piecewise linear function. FIG. 5B depicts adjusted, second separated image 120B including second group of pixels 112B having adjusted luminance values, as discussed herein.

Subsequent to adjusting pixels 112A, 112B forming the at least two separated images 118A, 120A (see., FIGS. 4A and 5A) to form or create adjusted, separated images 118B, 120B (see, FIGS. 4B and 5B), separated images 118B, 120B may be combined to form an altered image 122 (see, FIG. 6) from original image 100. That is, after separating original image 100 into separated images 118A, 120A and analyzing/adjusting each separated image 118A, 120A independent of one another to form adjusted, separated images 118B, 120B, adjusted, separated images 118B, 120B may be combined, rejoined, and/or consolidated to form altered image 122. The generated, altered image 122, as shown for example in FIG. 6, may include a single image formed from the combination of: adjusted, first separated image 118B including first group of pixels 112A having adjusted luminance values, and adjusted, second separated image 120B including second group of pixels 112B having adjusted luminance values. With comparison with FIG. 1 depicting original image 100, altered image 122 may include adjust luminance values for each of the plurality of pixels 112, which in turn may produce a more clear, real-world (e.g., what a user's eye perceives) image.

In a non-limiting example where original image 100 is formed as a color photo, additional processes may occur when separating original image 100 into distinct, separated images 118A, 120A. For example, separating color original image 100 may include first, separating original image 100 into a plurality of single-color images. The single-color images may be defined by pixels 112 that include and/or are formed as a detectable or identifiable color. For example, the single-color images may include a red color image, a green color image, and/or a blue color image, where each of the single-color images are formed from pixels associated with the single-color. Once separated into a plurality of single-color images, each single-color image may be separated into distinct images (e.g., separated images 118A, 120A). As similarly discussed herein with respect to FIGS. 4A and 5A, the at least two distinct, separated images for each single-color image of the plurality of single-color images may include a first separated image formed from the first group of pixels of the single-color image, and a second separated image formed from the second group of pixels of the single-color image. The second group of pixels may be distinct from the first group of pixels. Additionally, and similar to the non-limiting example discussed herein with reference to separated images 118A, 120A, the first separated image of each single-color image may correspond to an OFF image or an image formed from pixels that correspond to OFF visual pathway information, while the second separated image of each single-color image may correspond to an ON image or an image formed from pixels that correspond to ON visual pathway information. In the non-limiting example where color original image 100 is initially separated into three distinct, single-color images, subsequent ON-OFF separation may result in six (6) distinct, separated images—two (2) ON-OFF images for each of the three (3) colors. The six (6) distinct, separated images may be subsequently processed (e.g., adjusted, combined) in a similar manner as discussed herein with respect to FIGS. 4B, 5B, and 6. Redundant explanation of these processes has been omitted for brevity.

In another non-limiting example, an original color image may be separated into at a plurality of color and luminance component images. The color and luminance component images may be selected from HSL images (hue, saturation, lightness), HSV images (hue, saturation, value), or YUV images. In a non-limiting example, the color and luminance component images may be formed as HSL images. As such, separating the original color image may result in the formation of (1) a hue image, (2) a saturation image, and (3) a lightness image. Further in this non-limiting example, the lightness image of the three HSL images may be further separated into two distinct, separated images (e.g., ON/OFF images) and processed in a similar manner as discussed herein with respect to FIGS. 4A-6.

Figure 7A:
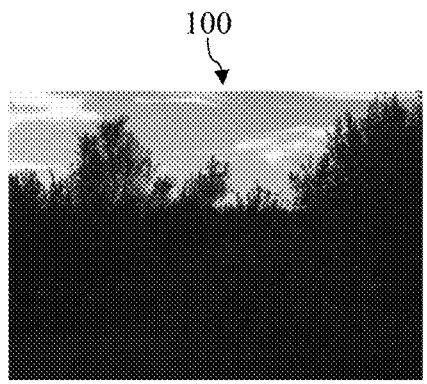
FIGS. 7A-7F show various illustrative views of original images (e.g., FIGS. 7A, 7C, 7E) captured by a device, and altered images (e.g., FIGS. 7B, 7D, 7F) generated based on the corresponding original images, according to embodiments of the disclosure.
Figure 7B:
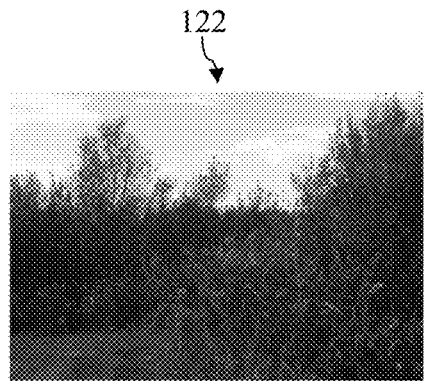
Figure 7C:
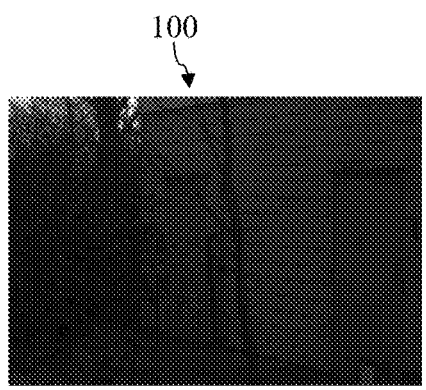
Figure 7D:
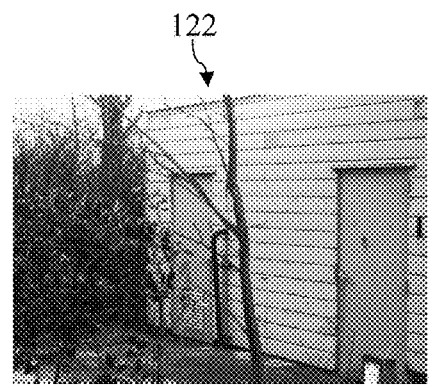
Figure 7E:
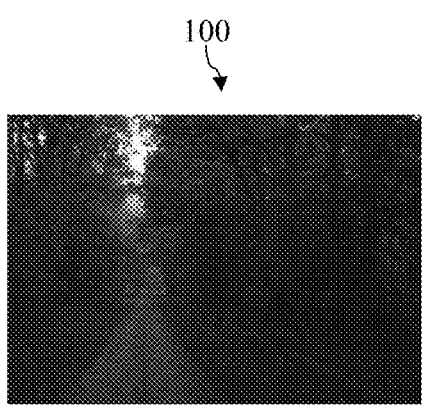
Figure 7F:
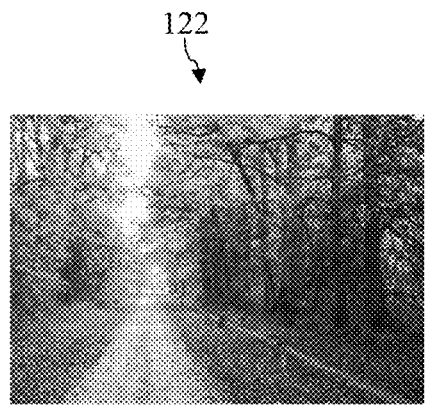

FIGS. 7A-7F show non-limiting examples of original images 100 and generated, altered images 122 using the processes discussed herein with respect to FIGS. 1-6. More specifically, FIGS. 7A, 7C, and 7E depict original images 100 captured by a image capture device (e.g., digital camera), and FIGS. 7B, 7D, and 7F show corresponding altered images 122 after performing the processes on original images 100 as discussed herein. Each altered image 122 depicts clear images, that provide more visible definition/detail in the image as a result of performing the processes for generating an altered image, as discussed here with respect to FIGS. 1-6 and 10. It is understood that similarly numbered and/or named components may function in a substantially similar fashion. Redundant explanation of these components has been omitted for clarity.

Figure 8:
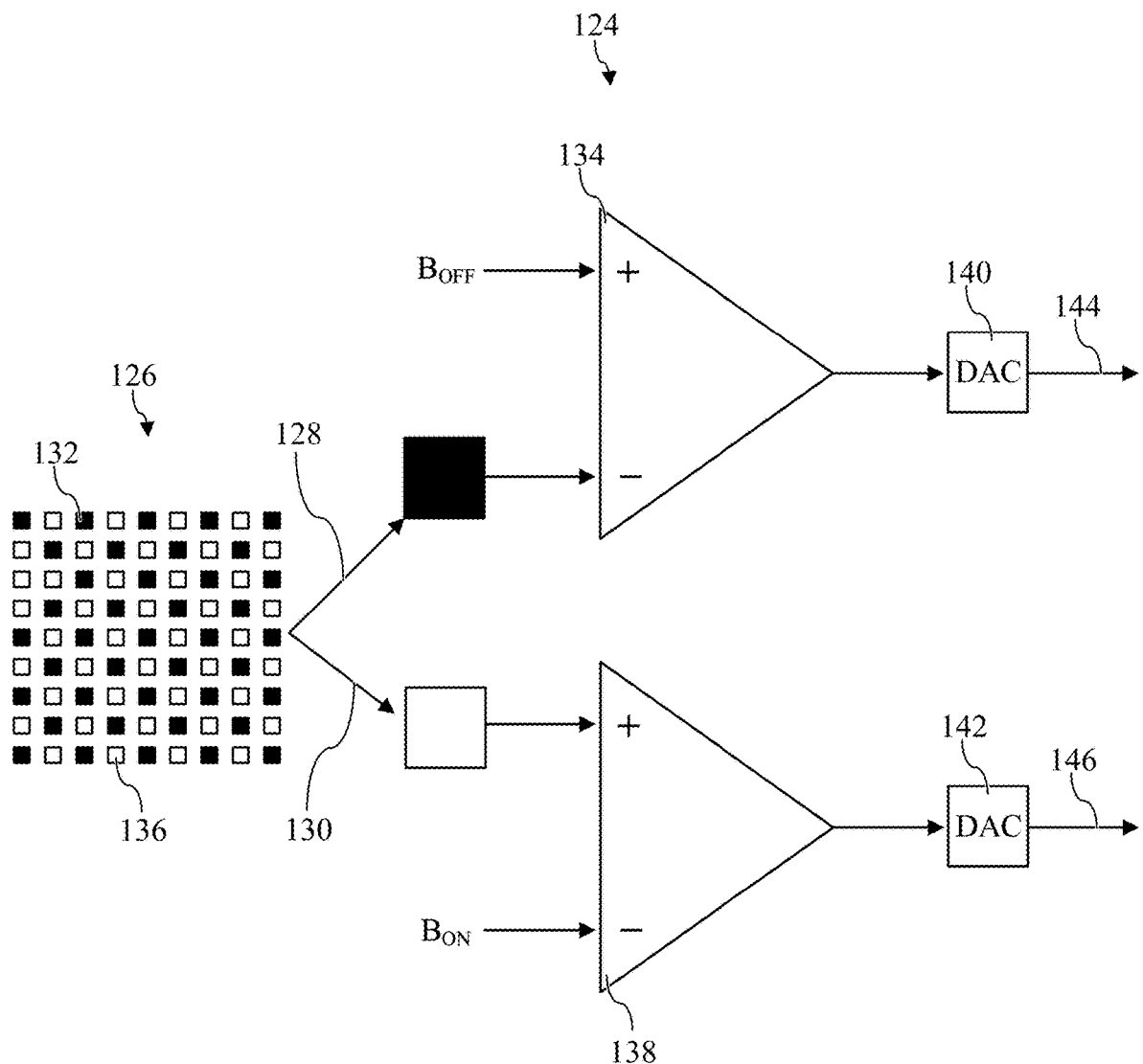
FIG. 8 shows a schematic view of a device structure included in an image capture device for generating various pixels of an original image, according to embodiments of the disclosure.
Figure 9:
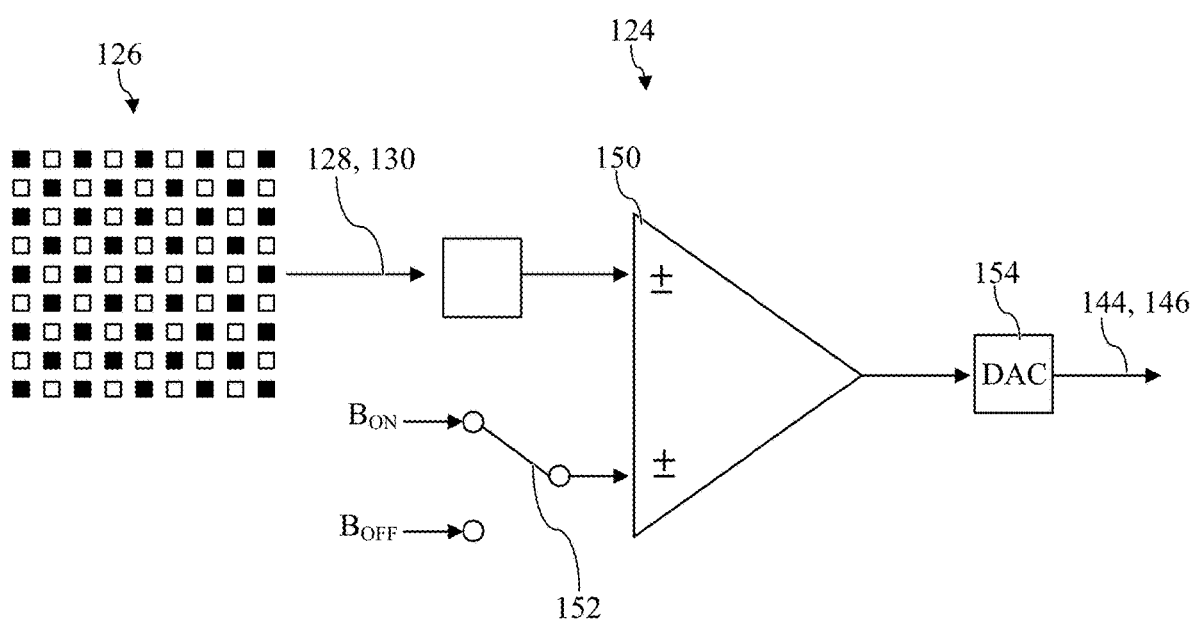
FIG. 9 shows a schematic view of a device structure included in an image capture device for generating various pixels of an original image, according to additional embodiments of the disclosure.
Figure 10:
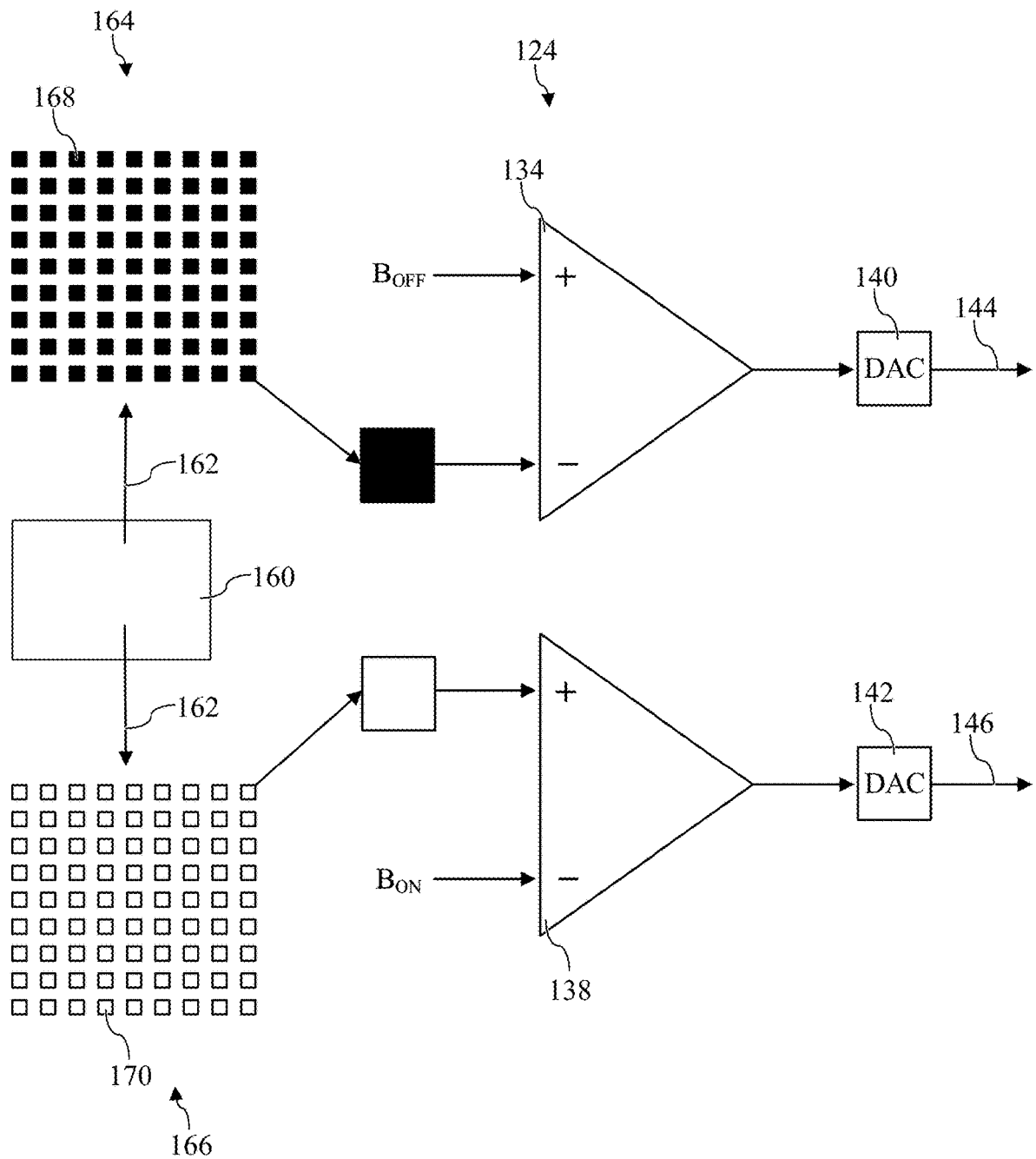
FIG. 10 shows a schematic view of a device structure included in an image capture device for generating various pixels of an original image, according to further embodiments of the disclosure.

FIGS. 8-10 depict schematic views of a device structure 124 included in an image capture device (see, FIG. 13) for generating various pixels of an original image 100. Device structures 124 may be included within image capture device (e.g., digital camera) in order to determine, identify, and/or isolate pixels 112 that may be associated with distinct separated images (e.g., ON/OFF images), as discussed herein.

As shown in FIG. 8, device structure 124 may include a sensor array 126. That is, device structure 124 may including a plurality of sensors 126 formed in an array. Sensor array 126 may receive light input during the exposure period while image capture device is capturing/obtaining an image or photo (e.g., original image 100). The light input may be detected by sensor array 126 and recognized and/or detected as a measurable voltage. In the non-limiting example, the measurable voltage may correspond to light intensity or more particularly a luminance value for each portion of the image captured by the image capture device. As such, once all light input is detected by sensor array 126, and in turn all luminance values are determined and/or calculated, a mean luminance value may be calculated for the captured image. As similarly discussed herein with respect to FIGS. 1-6, the calculated mean luminance value for the image captured by the image capture device including device structure 124 may be used to separate the captured image. Once calculated, the mean luminance value may determine how the light input/detected voltage 128, 130 for each sensor of sensor array 126 may be processed within device structure 124. For example, where the light input/detected voltage 128 at a first sensor 132 is below or equal to the calculated, mean luminance value, the input 128 may be provided to a first amplifier 134. Alternatively, where the light input/detected voltage 130 at a second/distinct sensor 136 is greater than the calculated, mean luminance value, the input 130 may be provided to a second amplifier 138. The different light inputs/detected voltages 128, 130 may be provided to either first amplifier 134 or second amplifier 138 using any suitable device (e.g., switching device—not shown) for additional processing. As shown in FIG. 8, first amplifier 134 and second amplifier 138 may be formed in parallel within device structure 124 and process input detected by sensor array 126 simultaneously, as discussed herein.

In response to detecting or determining the light input/detected voltage 128 received at first sensor 132 is below or equal to the calculated, mean luminance value, the light input/detected voltage 128 may be provided to first amplifier 134. As similarly discussed herein with respect to FIGS. 1-4A, light input/detected voltage 128 may correspond to light inputs of the captured image associated with OFF visual pathway information. In a non-limiting example, light input/detected voltage 128 may be subtracted from OFF background luminance values ($B_{OFF}$). OFF background luminance values ($B_{OFF}$) may include a predetermined luminance value defined independent of the image captured by the image capture device. In another non-limiting example, OFF background luminance values ($B_{OFF}$) may be defined and/or calculated based on luminance values for background portions of the image captured that are below or equal to the calculated, mean luminance value. In still another non-limiting example, OFF background luminance values ($B_{OFF}$) may be defined and/or calculated based on the luminance range/calculated mean luminance value for the image captured by the image capture device. Once light input/detected voltage 128 is subtracted from OFF background luminance values ($B_{OFF}$), the resulting luminance value may be amplified within first amplifier 134, and subsequently converted to an analog signal by a digital-to-analog converter (DAC) 140.

Similar to first amplifier 134, second amplifier 138 may process light input/detected voltage 130 according to processes discussed herein. That is, in response to detecting or determining the light input/detected voltage 130 received at second sensor 136 is greater than the calculated, mean luminance value, the light input/detected voltage 130 may be provided to second amplifier 138. As similarly discussed herein with respect to FIGS. 1-5A, light input/detected voltage 130 may correspond to light inputs of the captured image associated with ON visual pathway information. In a non-limiting example, and distinct from first amplifier 134, ON background luminance values ($B_{ON}$) may be subtracted from light input/detected voltage 130 at second amplifier 138. ON background luminance values ($B_{ON}$) may include a predetermined luminance value defined independent of the image captured by the image capture device. In another non-limiting example, ON background luminance values ($B_{ON}$) may be defined and/or calculated based on luminance values for background portions of the image captured that are greater than the calculated, mean luminance value. In still another non-limiting example, ON background luminance values ($B_{ON}$) may be defined and/or calculated based on the luminance range/calculated mean luminance value for the image captured by the image capture device. Once ON background luminance values ($B_{ON}$) is subtracted from light input/detected voltage 130, the resulting luminance value may be amplified within second amplifier 138, and subsequently converted to an analog signal by a digital-to-analog converter (DAC) 142.

First analog signal 144 generated by DAC 140 may be substantially similar to and/or may correspond to at least one pixel 112A of the image captured (e.g., original image 100), as similarly discussed herein with reference to FIGS. 1-6. Additionally, second analog signal 146 generated by DAC 142 may be substantially similar to and/or may correspond to at least one-pixel 112B of the image captured (e.g., original image 100). As such, and in the non-limiting example shown in FIG. 8, device structure 124 may be process the captured image and separate the image into two distinct separated images. In this example, the first image (e.g., analog signal 144) corresponds to an OFF image or an image formed from pixels that correspond to OFF visual pathway information, and the second image (e.g., analog signal 146) corresponds to an ON image or an image formed from pixels that correspond to ON visual pathway information.

FIG. 9 shows another non-limiting example of device structure 124. In the non-limiting example, device structure 124 may include a single amplifier 150. During operation, light inputs/detected voltages 128, 130 detected at sensor array 126 may be provided to single amplifier 150 for additional processing. For example, light input/detected voltage 128 corresponding to light inputs associated with OFF visual pathway information may be provided to single amplifier 150. Upon detection that light input/detected voltage 128 is provided to amplifier 150, OFF background luminance values ($B_{OFF}$) may be provided to single amplifier 150. That is, OFF background luminance values ($B_{OFF}$) and ON background luminance values ($B_{ON}$) may both be provided and/or included in amplifier 150. Dependent on light input/detected voltage 128, 130 provided to amplifier 150, a switching device 152 may allow for the desired OFF background luminance values ($B_{OFF}$) or ON background luminance values ($B_{ON}$) to be provided to and/or used by amplifier 150. In the non-limiting example where light input/detected voltage 128 is provided to amplifier 150, switching device 152 may be operational (if necessary) to provide OFF background luminance values ($B_{OFF}$) to amplifier 150, and light input/detected voltage 128 may be subsequently subtracted from OFF background luminance values ($B_{OFF}$), as similarly discussed herein with respect to FIG. 8. Alternatively where light input/detected voltage 130 is provided to amplifier 150, switching device 152 may be operational (if necessary) to provide ON background luminance values ($B_{ON}$) to amplifier 150, and ON background luminance values ($B_{ON}$) may be subsequently subtracted from light input/detected voltage 130—also similarly discussed herein with respect to FIG. 8. The resulting values may be subsequently amplified by single amplifier 150, and converted to analog signals 144, 146 by DAC 154.

FIG. 10 shows another non-limiting example of device structure 124. In the non-limiting example, device structure 124 may include a prism or any other suitable light/signal refractive device (hereafter, "Prism 160") that may receive input cause by the exposure or capturing of the original image. Prism 160 may receive the input and subsequently generated, reflect, refract, and/or produce two identical signals 162. Each identical signal 162 may be provided to one of two sensor arrays 164, 166. In the non-limiting example shown in FIG. 10, first sensor array 164 may correspond to and/or may be in communication with first amplifier 134. First sensor array 164 may include a plurality of sensors 168 that may be configured to detect signals having light input/detected voltages (e.g., light input/detected voltage 128) that correspond to OFF image or an image formed from pixels that correspond to OFF visual pathway information. Similarly, second sensor array 166 may correspond to and/or may be in communication with second amplifier 138. Second sensor array 166 may include a plurality of sensors 170 that may be configured to detect signals having light input/detected voltages (e.g., light input/detected voltage 130) that correspond to ON image or an image formed from pixels that correspond to ON visual pathway information. During operation, signal 162 may be provided to each sensor array 164, 166, via prism 160, where the signal may be processed. If signal 162 is determined to be equal to and/or results in the formation of light input/detected voltage 128, first sensor array 164 may provide light input/detected voltage 128 to first amplifier 134 for similar processing as discussed herein with respect to FIG. 8. In this example, signal 162 provided to second sensor array 166 may not be provided to second amplifier 138, as signal 162 does not include the characteristics (e.g., light input/desired voltage) to be processed by sensors 170 of second sensor array 166. In examples where signal 162 is determined to be equal to and/or results in the formation of light input/detected voltage 130, the opposite process of signal 162 may be achieved using second amplifier 138, as similarly discussed herein.

In another non-limiting example (not shown), device structure 124 may not differentiate light input/detected voltage 128, 130 prior to providing the information to a single amplifier structure (see, FIG. 9). Rather, all light inputs/detected voltages 128, 130 may be provided to amplifier 150 for processing. In this example, each light input/detected voltage 128, 130 may be subtracted from OFF background luminance values ($B_{OFF}$), and have ON background luminance values ($B_{ON}$) subtracted there from. In the example where light input/detected voltage 128, 130 subtracted from OFF background luminance values ($B_{OFF}$) results in a positive solution, it may be determined that light input/detected voltage 128, 130 is associated with OFF visual pathway information and analog signal 144 may be generated, as discussed herein. Alternatively, if light input/detected voltage 128, 130 subtracted from OFF background luminance values ($B_{OFF}$) results in a negative or zero (0) solution, it may be determined that light input/detected voltage 128, 130 is associated with ON visual pathway information. As a result, ON background luminance values ($B_{ON}$) may subsequently subtracted from light input/detected voltage 128, 130 and analog signal 146 may be subsequently generated, as discussed herein.

In non-limiting examples, both parallel (e.g., FIGS. 8 and 10) and serial (e.g., FIG. 9) architectures or structures may be implemented in active-pixel and passive-pixel sensor arrays as well as in Charge-coupled device (CCD) image capture devices (e.g., cameras). Formation of OFF and ON images, as well as the pre-amplification, may be carried out internally in active-pixel imaging systems by parallel or serial integrated circuitry/structures adjacent to each photosite. Each pixel may contain two photosites corresponding to ON or OFF images with single transistor circuitry as well as one photosite with two transistor circuitries pre-amplifying ON or OFF images. ON/OFF external amplification circuits may also be embedded in the same integrated circuit in Complementary Metal Oxide Semiconductor (CMOS) image capture devices. Pixel readouts may be carried out several times without changing the integrated charge of the photosites in active-pixel sensor arrays. This may enable the serial processing of ON and OFF images with single image exposure and avoiding motion artifacts. ON/OFF pre-amplification may also be carried out by dynamically changing the bias voltage of the photodiodes in CMOS image capture device, as well as the reset voltages used for resetting the photodiode's states.

Figure 11A:
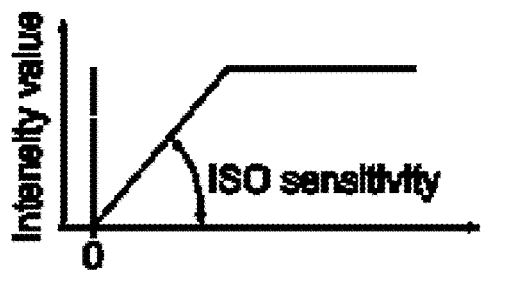
FIG. 11A shows a graphical relationship between sensor-detected light input/voltages and luminance intensity values for conventional camera devices, according to embodiments of the disclosure.
Figure 11B:
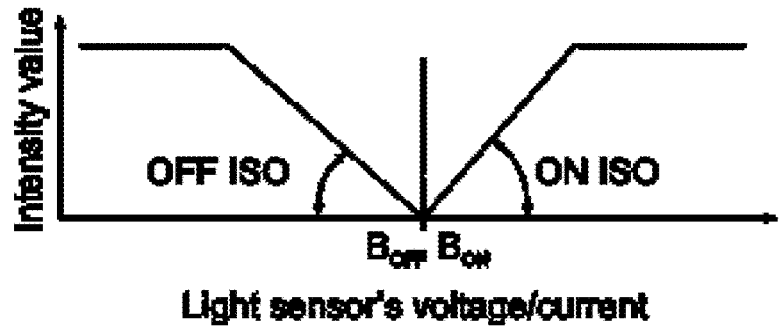
FIG. 11B shows a graphical relationship between sensor-detected light input/voltages and luminance intensity values for camera devices including device structures shown in FIGS. 8-10, according to embodiments of the disclosure.
Figure 11C:
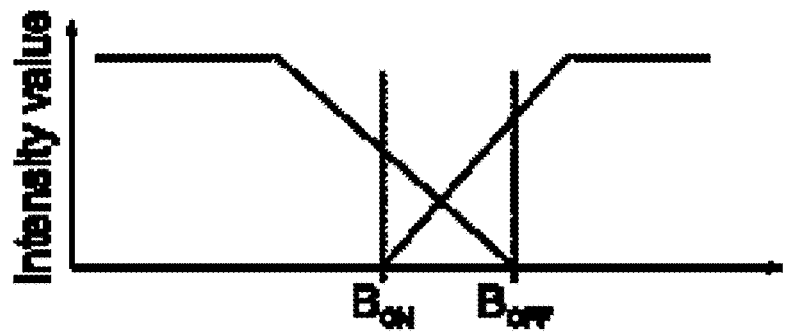
FIG. 11C shows a graphical relationship between sensor-detected light input/voltages and luminance intensity values for camera devices including device structures shown in FIGS. 8-10, according to additional embodiments of the disclosure.

FIGS. 11A-11C depict graphical relationship between sensor-detected light input/voltages and luminance intensity values for camera devices. More specifically, FIG. 11A shows the above-identified relationship for conventional cameras, and FIGS. 11B and 11C show the graphical relationship identified above for image capture devices (e.g., cameras) that include device structures shown in FIGS. 8, 9, and/or 10.

In the non-limiting example shown in FIG. 11A, the pixel intensity values for conventional cameras are linearly dependent on the luminance of the captured image until the pixel intensity values reach a saturation value. As discussed herein, improved image capture devices and/or processed captured images may be improved by considering light and dark contrasts with ON and OFF pathways, as shown in the non-limiting examples of FIGS. 11B and 11C, instead of absolute luminance (e.g., conventional processes), as shown in FIG. 11A. In the example shown in FIG. 11B, image capture device including device structure 124 (see, FIGS. 8-10) may segregate sensor array's 126 output (e.g., light output/detected voltages) on two ON and OFF channels with different sensitivities. When the background of ON and OFF images (e.g., $B_{ON}$, $B_{OFF}$) are the same, there may be no overlap between the ON and OFF images (e.g., separated images 118A, 120A). By overlapping OFF background luminance values ($B_{OFF}$) and ON background luminance values ($B_{ON}$), a part of the visual scene/captured image may be sampled with greater accuracy and hence higher dynamic range. As shown in FIG. 11C, overlapping ON and OFF images may also enhance the dynamic range of an imaged captured by also increasing the signal to noise ratio through the integrations of ON and OFF images and/or analysis.

Figure 12:
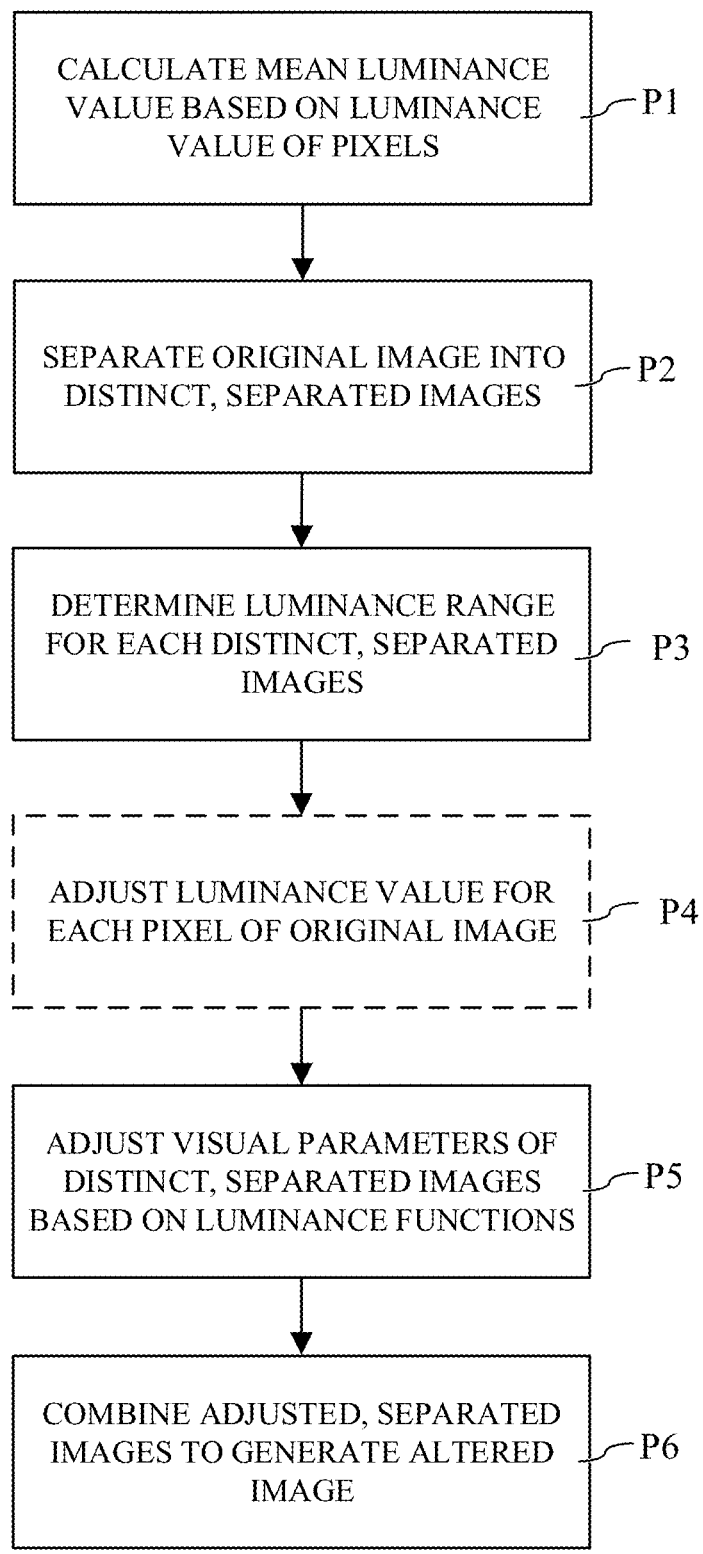
FIG. 12 shows a flowchart illustrating processes for generating altered images, according to embodiments of the disclosure.

FIG. 12 depicts a non-limiting example processes for generating altered images. Specifically, FIG. 12 shows a flowchart depicting a process for generating an altered image based on ON-OFF visual pathway information. In some cases, a computing device(s) and/or system may be used to perform the processes for generating altered images, as discussed herein with respect to FIG. 13. In other non-limiting examples, image captured devices including device structure 124 may be used to perform the processes for generating altered images, as discussed herein with respect to FIGS. 8-10.

In process P1 a mean luminance value may be calculated. That is, a mean luminance value for the original image may be calculated based on the luminance value for each pixel of the plurality of pixels forming the original image. The mean luminance value may be based on, at least in part, the upper and lower limits of the luminance values for each of the plurality of pixels of the original image.

In process P2, the original image may be separated into at least two distinct images. The separation of original image may be based on the calculated mean luminance value of the original image, as determined in process P1. In a non-limiting example, the distinct images may include a first separated image formed from a first group of pixels of the original image, and a second separated image formed from a second group of pixels of the original image. The second group of pixels forming the second separated image may be distinct from the first group of pixels forming the first separated image. Separating the original image may include comparing the luminance value for each pixel of the plurality of pixels to the calculated mean luminance value for the original image. Once compared, a pixel of the plurality pixels may be associated with the first group of pixels included in the first separated image in response to determining the luminance value of the pixel is less than or equal to the mean luminance value. Alternatively, a pixel of the plurality pixels may be associated with the second group of pixels included in the second separated image in response to determining the luminance value of the pixel is greater than the mean luminance value. In a non-limiting example, the first separated image may correspond to an OFF image or an image formed from pixels that correspond to OFF visual pathway information, and the second separated image may correspond to an ON image or an image formed from pixels that correspond to ON visual pathway information.

In process P3, a luminance range for each distinct, separated image may be determined. More specifically, a first luminance range for the first separated image may be determined, and a second, distinct luminance range for the second separated image bet be determined. In a non-limiting example, each pixel of the first group of pixels forming first separated image may be analyzed to determine the first luminance range, as defined by the luminance value for each pixel. Additionally, each pixel of the second group of pixels forming second separated image may be analyzed to determine the second luminance range, as defined by the luminance value for each pixel. In a non-limiting example, the luminance range is between approximately 0 candela per square meter ($cd/m^2$) and approximately 15,000 $cd/m^2$.

In process P4, shown in phantom as optional, the luminance value for each pixel of the distinct, separated images may be adjusted. More specifically, the luminance value for each pixel of the first group of pixels forming the first separated image and the luminance value for each pixel of the second group of pixels forming the second separated image may be numerically truncated, adjusted, shifted, and/or manipulated. In a non-limiting example, corresponding luminance values for each pixel of the first group of pixels forming the first separated image may be "numerically" adjusted such that the lower limit and upper limit of the luminance values that define the first luminance range may be defined by a negative limit and zero limit. Furthermore, corresponding luminance values for each pixel of the second group of pixels forming the second separated image may be "numerically" adjusted such that the lower limit and upper limit of the luminance values that define the second luminance range may be defined by a zero limit and positive limit. Additionally where the luminance values are adjusted, the calculated mean luminance value may also be adjusted (e.g., 0 $cd/m^2$). The numerical adjustment is understood as manipulating or adjusting determined/calculated values, and does not manipulate, alter, and/or adjust visual characteristics (e.g., contrast, saturation, ISO, etc.) of the original image and/or the various pixels forming the original image.

In process P5, visual parameters of the distinct, separated images may be adjusted. The visual parameters may be adjusted based on (predetermined) luminance functions. More specifically, visual parameters of the first separated image formed from the first group of pixels may be adjusted based on a first luminance function. In a non-limiting example, the first luminance function may include a linear function defined between a predetermined minimum dark/OFF luminance contrast and a predetermined maximum dark/OFF luminance contrast. As such, adjusting the visual parameters of the first separated image may include adjusting the actual luminance value of each pixel included in the first group of pixels for the first separated image to an adjusted luminance value based a corresponding minimum dark/OFF luminance contrast and a predetermined maximum dark/OFF luminance contrast included in the linear function. Additionally, visual parameters of the second separated image formed from the second group of pixels may be adjusted based on a second luminance function. In non-limiting examples, the second luminance function may include a sigmoid function defining a predefined minimum light/ON luminance contrast and a predefined maximum light/ON luminance contrast, or a piecewise linear function defining a plurality of distinct predetermined minimum light/ON luminance contrasts and a plurality of predetermined maximum light/ON luminance contrasts. As such, adjusting the visual parameters of the second separated image may include adjusting the actual luminance value of each pixel included in the second group of pixels for the second separated image to an adjusted luminance value based a corresponding light value included one of the sigmoid function or the piecewise linear function.

In process P6, the adjusted, separated images may be combined. That is, the adjusted, separated images formed in process P5 may be combined to generate an altered image of the original image. The generated, altered image may include a single image formed from the combined adjusted, first separated image and the adjusted, second separated image. The generated, altered image may include adjust luminance values for each of the plurality of pixels, which in turn may produce a more clear, real-world (e.g., what a user's eye perceives) image than the original image captured by the image capture device.

Figure 13:
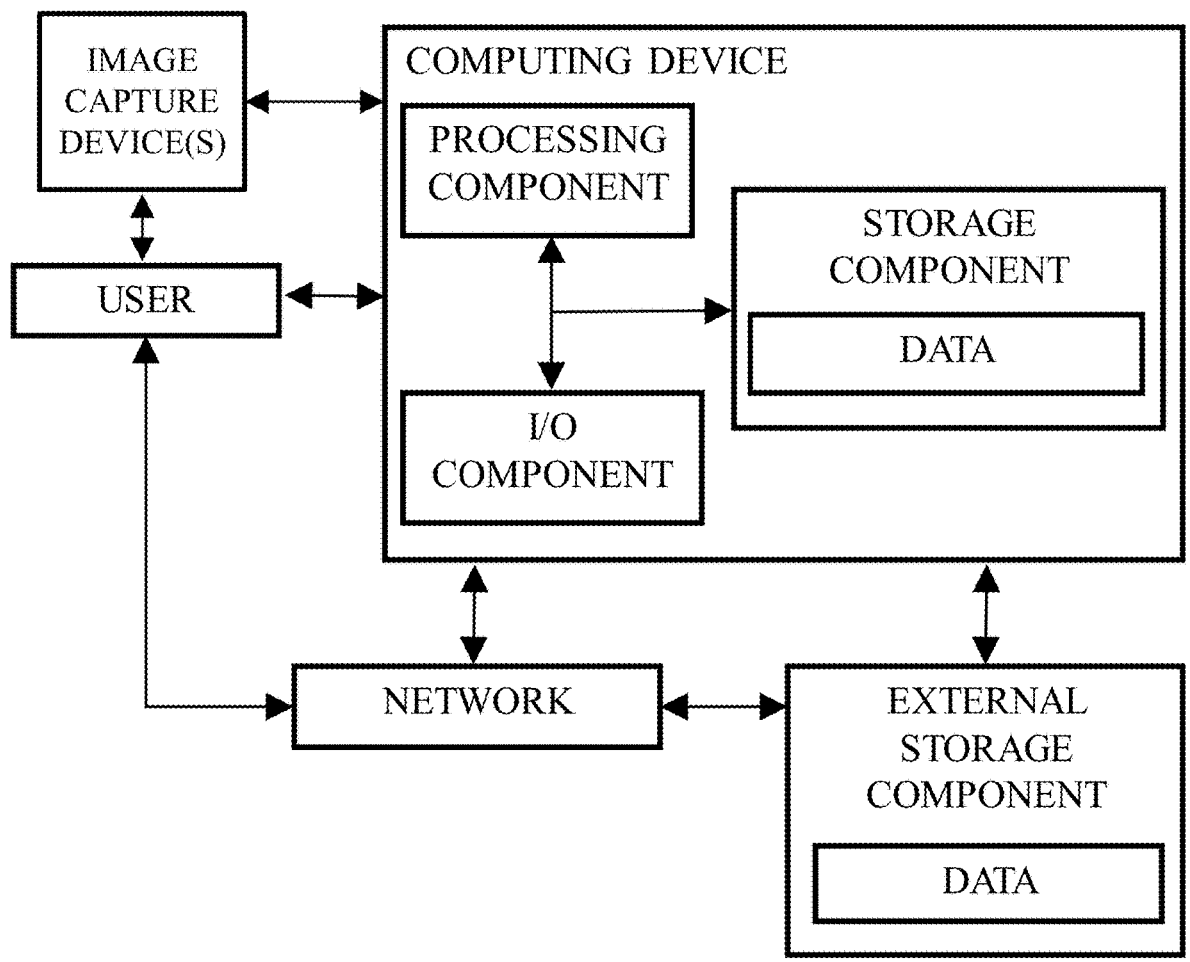
FIG. 13 shows a schematic view of a computing system configured to generate altered images based on original images captured by image capture device(s), according to embodiments of the disclosure.

FIG. 13 depicts a schematic view of a computing environment or system (hereafter, "computing system"), and the various components included within computing system. In the non-limiting example shown in FIG. 13, computing system may include at least one computing device that may be configured to generate altered images based on original images by performing the processes P1-P6 discussed herein with respect to FIGS. 1-6 and 12. It is understood that similarly numbered and/or named components may function in a substantially similar fashion. Redundant explanation of these components has been omitted for clarity.

It is understood that computing device(s) may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and/or computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Computing system shown in FIG. 13 may include any type of computing device(s) and for example includes at least one processor or processing component(s), storage component, input/output (I/O) component(s) (including a keyboard, touchscreen, or monitor display), and a communications pathway. In general, processing component(s) execute program code which is at least partially fixed or stored in storage component. While executing program code, processing component(s) can process data, which can result in reading and/or writing transformed data from/to storage component and/or I/O component(s) for further processing. The pathway provides a communications link between each of the components in computing device(s). I/O component can comprise one or more human I/O devices, which enables user to interact with computing device(s) to analyze received/obtained/captured original image(s) and generate altered images, as discussed herein. Computing device(s) may also be implemented in a distributed manner such that different components reside in different physical locations.

Storage component may also include modules, data and/or electronic information relating to various other aspects of computing system. Specifically, operational modules, electronic information, and/or data relating to media post MM data, image segmentation data, image collapsing data, image rewindowing data, image denoising data, and report generation data. The operational modules, information, and/or data may include the required information and/or may allow computing system, and specifically computing device, to perform the processes discussed herein for generating altered images.

Computing system, and specifically computing device of computing system, may also be in communication with external storage component. External storage component may be configured to store various modules, data and/or electronic information relating to various other aspects of computing system, similar to storage component of computing device(s). Additionally, external storage component may be configured to share (e.g., send and receive) data and/or electronic information with computing device(s) of computing system. In the non-limiting example shown in FIG. 13, external storage component may include any or all of the operational modules and/or data shown to be stored on storage component. Additionally, external storage component may also include a secondary database that user may interact with, provide information/data to, and/or may include information/data relating to poster. In a non-limiting example, external storage component may be a cloud-based storage component or system. In other non-limiting examples, external storage component may also include and/or be in communication with a neural network to aid in computation and/or data processing as discussed herein.

In a non-limiting example shown in FIG. 13, computing device(s) may be in communication with and/or may be configured to share (e.g., send and receive) data and/or electronic information over a network. Network may represent a closed network, such as a local area network (LAN) or may include the internet. Network may also include secondary database including similar data as storage component, and/or may include or be in communication with a neural network to aid in computation and/or data processing as discussed herein.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As discussed herein, various systems and components are described as "obtaining" data (e.g., generating/obtaining the original photo, etc.). It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for generating an altered image, the method comprising:
   separating an original image into distinct images based on a luminance value for each pixel of a plurality of pixels forming the original image, the distinct images including:
      a first separated image formed from a first group of pixels of the original image, and
      a second separated image formed from a second group of pixels of the original image, the second group of pixels distinct form the first group of pixels;
   determining a first luminance range for the first separated image, the first luminance range based on the luminance value for each pixel of the first group of pixels of the first separated image;
   determining a second luminance range for the second separated image, the second luminance range based on the luminance value for each pixel of the second group of pixels,
   wherein the second luminance range is distinct from the first luminance range;
   adjusting visual parameters of the first separated image formed from the first group of pixels based on a first luminance function;
   adjusting visual parameters of the second separated image formed from the second group of pixels based on a second luminance function; and combining the adjusted, first separated image and the adjusted, second separated image to generate the altered image.

2. The method of claim 1, further comprises:
calculating a mean luminance value for the original image based on the luminance value for each pixel of the plurality of pixels forming the original image.

3. The method of claim 2, wherein the separating of the original image into the two distinct images further comprises:
comparing the luminance value for each pixel of the plurality of pixels to the calculated mean luminance value for the original image;
associating a pixel of the plurality pixels with the first group of pixels included in the first separated image in response to determining the luminance value of the pixel is less than or equal to the mean luminance value; and
associating the pixel of the plurality pixels with the second group of pixels included in the second separated image in response to determining the luminance value of the pixel is greater than the mean luminance value.

4. The method of claim 1, wherein the first separated image corresponds to an OFF image, and the second separated image corresponds to an ON image.

5. The method of claim 1, wherein the generated, altered image includes a single image formed from the combined adjusted, first separated image and the adjusted, second separated image.

6. The method of claim 1, wherein the separating of the original image into the distinct images further including:
separating the original image into a plurality of single-color images;
separating each single-color image of the plurality of single-color image into the distinct images, each of the distinct images including:
the first separated image formed from the first group of pixels of the single-color image, and
the second separated image formed from the second group of pixels of the single-color image, the second group of pixels distinct form the first group of pixels.

7. The method of claim 6, wherein the plurality of single-color images include:
a red color image;
a green color image; and
a blue color image.

8. A system comprising:
an image capture device; and
at least one computing device operably connected to the image capture device, the at least one computing device generating an altered image from an original image captured by the image capture device by performing processes including:
separating an original image into distinct images based on a luminance value for each pixel of a plurality of pixels forming the original image, the distinct images including:
a first separated image formed from a first group of pixels of the original image, and
a second separated image formed from a second group of pixels of the original image, the second group of pixels distinct form the first group of pixels;
determining a first luminance range for the first separated image, the first luminance range based on the luminance value for each pixel of the first group of pixels of the first separated image;

determining a second luminance range for the second separated image, the second luminance range based on the luminance value for each pixel of the second group of pixels,
wherein the second luminance range is distinct from the first luminance range;
adjusting visual parameters of the first separated image formed from the first group of pixels based on a first luminance function;
adjusting visual parameters of the second separated image formed from the second group of pixels based on a second luminance function; and
combining the adjusted, first separated image and the adjusted, second separated image to generate the altered image.

9. The system of claim 8, wherein the at least one computing device performing further processes including:
calculating a mean luminance value for the original image based on the luminance value for each pixel of the plurality of pixels forming the original image.

10. The system of claim 9, wherein the separating of the original image into the two distinct images further comprises:
comparing the luminance value for each pixel of the plurality of pixels to the calculated mean luminance value for the original image;
associating a pixel of the plurality pixels with the first group of pixels included in the first separated image in response to determining the luminance value of the pixel is less than or equal to the mean luminance value; and
associating the pixel of the plurality pixels with the second group of pixels included in the second separated image in response to determining the luminance value of the pixel is greater than the mean luminance value.

11. The system of claim 8, wherein the first separated image corresponds to an OFF image, and the second separated image corresponds to an ON image.

12. The system of claim 8, wherein the generated, altered image includes a single image formed from the combined adjusted, first separated image and the adjusted, second separated image.

13. The system of claim 8, wherein the separating of the original image into the distinct images further including:
separating the original image into a plurality of single-color images;
separating each single-color image of the plurality of single-color image into the distinct images, each of the distinct images including:
the first separated image formed from the first group of pixels of the single-color image, and
the second separated image formed from the second group of pixels of the single-color image, the second group of pixels distinct form the first group of pixels.

14. The system of claim 13, wherein the plurality of single-color images include:
a red color image;
a green color image; and
a blue color image.

15. The system of claim 8, wherein the image capture device includes at least one of:
a photography camera,
a video camera,
a scanner, an x-ray imaging device, a computed tomography (CT) device, an ultrasound device, or a magnetic resonance imagining (MM) device.

16. A computer program product stored on a non-transitory computer-readable storage medium, which when executed by a computing system, generates an altered image based on an original image captured by an image capture device, the computer program product comprising:

program code that separates an original image into distinct images based on a luminance value for each pixel of a plurality of pixels forming the original image, the distinct images including:

a first separated image formed from a first group of pixels of the original image, and a second separated image formed from a second group of pixels of the original image, the second group of pixels distinct form the first group of pixels;

program code that determines a first luminance range for the first separated image, the first luminance range based on the luminance value for each pixel of the first group of pixels of the first separated image;

program code that determines a second luminance range for the second separated image, the second luminance range based on the luminance value for each pixel of the second group of pixels, wherein the second luminance range is distinct from the first luminance range;

program code that adjusts visual parameters of the first separated image formed from the first group of pixels based on a first luminance function;

program code that adjusts visual parameters of the second separated image formed from the second group of pixels based on a second luminance function; and program code that combines the adjusted, first separated image and the adjusted, second separated image to generate the altered image.

17. The program product of claim 16, further comprises:

program code that calculates a mean luminance value for the original image based on the luminance value for each pixel of the plurality of pixels forming the original image.

18. The program product of claim 17, wherein the program code that separates the original image into the two distinct images further comprises:

program code that compares the luminance value for each pixel of the plurality of pixels to the calculated mean luminance value for the original image;

program code that associates a pixel of the plurality pixels with the first group of pixels included in the first separated image in response to determining the luminance value of the pixel is less than or equal to the mean luminance value; and program code that associates the pixel of the plurality pixels with the second group of pixels included in the second separated image in response to determining the luminance value of the pixel is greater than the mean luminance value.

19. The program product of claim 16, wherein the first separated image corresponds to an OFF image, and the second separated image corresponds to an ON image.

20. The program product of claim 16, wherein the program code that separates the original image into the distinct images further including:

program code that separates the original image into a plurality of single-color images, the plurality of single-color images including:

a red color image;

a green color image; and a blue color image;

program code that separates each single-color image of the plurality of single-color image into the distinct images, each of the distinct images including:

the first separated image formed from the first group of pixels of the single-color image, or the second separated image formed from the second group of pixels of the single-color image, the second group of pixels distinct form the first group of pixels.

* * * * *